United States Patent [19]
Lapoint, Jr.

[11] Patent Number: 5,188,731
[45] Date of Patent: Feb. 23, 1993

[54] FILTER APPARATUS WITH A FLEXIBLE COLLAR

[76] Inventor: John Lapoint, Jr., 17 Foss Rd., Lewiston, Me. 04240

[21] Appl. No.: 592,922

[22] Filed: Oct. 4, 1990

[51] Int. Cl.$^5$ ................. B01D 29/11; B01D 27/00
[52] U.S. Cl. ................. 210/232; 210/445; 210/448; 210/452; 210/470
[58] Field of Search ............ 210/470, 232, 323.2, 210/315, 344, 342, 234, 236, 237, 333.01, 331, 450, 452, 451, 448; 55/385.1

[56] References Cited

U.S. PATENT DOCUMENTS

| | | | |
|---|---|---|---|
| 3,061,106 | 4/1960 | Bradbury | 210/232 |
| 3,640,392 | 2/1972 | Smith et al. | 210/232 |
| 3,814,261 | 6/1974 | Morgan, Jr. | 210/445 |
| 3,931,015 | 6/1976 | Jenkins | 210/232 |
| 4,024,057 | 5/1977 | McCoy | 210/470 |
| 4,081,379 | 3/1978 | Smith | 210/232 |
| 4,436,621 | 3/1984 | Picker | 210/232 |
| 4,702,790 | 10/1987 | Hug et al. | 210/232 |
| 4,802,900 | 2/1989 | Ball et al. | 55/381 |
| 5,015,376 | 5/1991 | Picek | 210/445 |
| 5,045,194 | 9/1991 | Gershenson | 210/445 |
| 5,075,004 | 12/1991 | Gershenson et al. | 210/445 |
| 5,774,769 | 11/1973 | Smith | 210/232 |

Primary Examiner—Robert A. Dawson
Assistant Examiner—Ana M. Fortuna
Attorney, Agent, or Firm—Lorraine Donaldson

[57] ABSTRACT

Filter apparatus for filtering liquids in pressure vessels. The invention solves the sealing problem associated with filter bags by providing a filterable seal fabricated from the filter material itself fastening to a flexible collar. The filter provides simple insertion or removal, low cost of fabrication yet ensures that substantially all liquid passing through the pressure vessel will be filtered.

6 Claims, 1 Drawing Sheet

FILTER APPARATUS WITH A FLEXIBLE COLLAR

BACKGROUND OF THE INVENTION

1. Field of the Invention

The invention relates to filters for use in pressure vessels.

2. Description of the Related Art

The use of filter bags in pressured vessels is known in the art. The purpose of the filter bag is remove contaminants from the various fluids that are poured through them. Each design has attempted to provide a low cost, highly efficient filter that can be easily changed. The major obstacle that has not been overcome is to provide a low cost method of ensuring that substantially all of the liquid goes through the filter without bypassing it because of an imperfect seal.

U.S. Pat. No. 4,202,966, issued to Morgan on May 27, 1980, discloses a filter element that is claimed to provide a hermetic seal between the filter and the pressure vessel that contains it. Tests by the inventor on Poly-Loc ®, a filter element based on the teaching of this patent reveal substantial liquid is able to bypass the filter element under simulated operating conditions.

Similar tests conducted on other commercially available filter elements also reveal that substantial levels of liquid are able to bypass the filter element under simulated operating conditions.

Indeed, as far back as 1929, McGonigal, in U.S. Pat. No. 1,782,500, sought to solve the problem of easily changing filter elements yet providing a leak-proof seal. This design features an elaborate retaining mechanism that is impractical for today's filter needs.

U.S. Pat. No. 3,931,015, issued to Jenkins on Jan. 6, 1976, uses a filter element design that incorporates the use of the pressure vessel cap as a means to attempt a tight seal so that all the liquid will pass through the filter element.

Another attempt, U.S. Pat. No. 4,081,379, issued to Smith on Mar. 28, 1978, discloses the use of a complex multi-faceted filter bag being positioned between two parallel surfaces with a single sealing arrangement.

U.S. Pat. Nos. 3,959,137; 732,659; 2,191,395; 3,935,112; 3,651,947 and U.K Patent No. 242,082 disclose other designs for filter elements and are of general interest to the application.

Prior art filter elements have not met the need for a low cost, easily changed filter element that prevents unfiltered liquid from exiting the system.

SUMMARY OF THE INVENTION

It is an object of the invention to provide a filter bag capable of containing the contaminant in the filter bag for rapid disposal.

It is a still another object of the invention to provide a low cost, easily installed or removed filter element.

It is still another object of the invention to provide a filter element that can be easily adapted to different pore size and flow requirements.

It is a final object of the invention to provide a filterable seal between the pressure vessel and the filter element so that substantially all of the liquid is filtered before exiting the system.

The invention comprises a flexible collar, having top and bottom surfaces, outer and inner diameters, with said inner diameter forming a opening for the liquid to pass into said filter, and porous flexible filter bag. The porous filter bag has outer and inner surfaces and a top edge forming a radially directed flange. The pore size of the filter material corresponds to the liquid being filtered with said filter material. The filter material is formed into a filter bag with an opening at one end directing liquid to pass through the inner surface and exit the outer surface. The filter bag is attached to the collar with the top edge of filter material being adjacent to the outer diameter of said collar. Thus, a gasket of filter material is formed and interposed between said collar and the pressure vessel. This gasket forms a circumferential filterable seal when said collar is positioned in the pressure vessel.

DETAILED DESCRIPTION OF THE INVENTION

Figure 1:
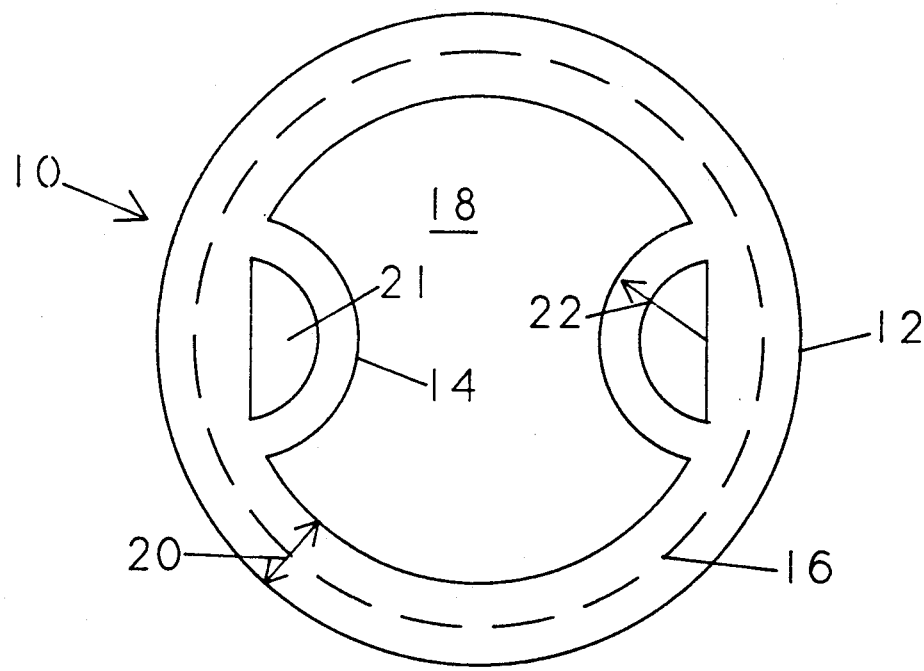
FIG. 1 illustrates a top view of the filter element according to the invention.

FIG. 1 illustrates a top view of invention 10. Polyethylene collar 12 provides a support for filter material 18. The dimensions of collar 12, are adapted to fit standard commercial pressure vessels. A typical size would be approximately 7 inches in diameter. The thickness of collar 12 is not critical, however, the preferred dimension is 1/16 of an inch.

Handles 14 are sized to be convenient for an operator to easily install and remove invention 10. Radius 22 of handles 14 is preferably at least one inch in order to enable an operator to insert a finger into holes 21 for insertion/removal. Collar width 20 again is not critical but should be great enough to provide a sufficient attachment surface yet providing as large as possible an opening to the filter material 18. The preferable dimension is approximately ½ inch.

Filter material 18 is sewed to collar 12 along stitch line 16. The thread used should be 69 min. strength with at least 4 stitches to the inch. Again the exact placement of sewing line 16 is not critical but preferably should be approximately centered on collar 12. This will permit greater latitude in sewing operations and thus reduce labor costs.

While sewing is the preferable method of attaching material 18 to collar 12, it could also be attached by heat sealing, gluing or spot welding. The preferred method of attachment would correspond to the selected collar material and the filter material in consideration of the application.

Typical material 18 selection would be various micron rated medium for use in various liquid filtration applications. However, other uses would dictate the selection of different material characteristics to affect a different filterable pore size. A variety of textile fabrics, both woven and non-woven could be used depending on the filter requirements.

Figure 2:
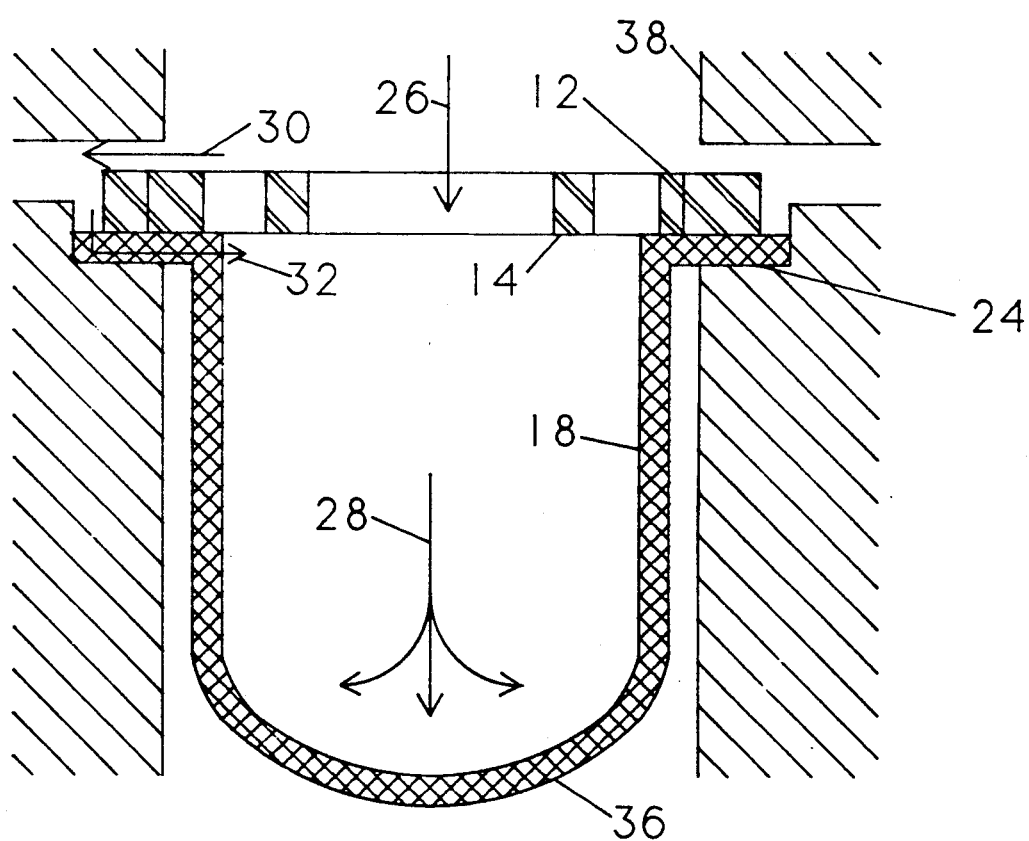
FIG. 2 illustrates a cross-sectional side view of the filter element according to the invention.

FIG. 2 illustrates a cross-sectional side view according to the invention. Flow arrow 26 shows the direction of liquid (not shown) entering filter bag 36. Ideally, all liquid in a perfectly sealed filter would follow flow arrow 28. However, according to the inventor's research on currently available commercial filter bags, a substantial amount of the liquid follows flow arrow 30 thus bypassing filter bag 36.

State-of-the-art filter bags, attempting to meet the need for easily replaceable filter bags, do achieve high levels of filtering efficiency.

Invention 10, rather than trying to achieve a perfect seal with its attendant high cost, instead provides a filterable seal. Filter material 18 is attached under collar 12 as shown to serve as a gasket. When invention 10 is placed within a pressure vessel, it is seated on pressure vessel retainer basket 24. When retainment means 38 is engaged against collar 12, filter material 18 is compressed and forms a filterable gasket that will filter any material that escapes through the partial seal provided by retainment means 38 engaging collar 12.

Therefore, if any fluid follows flow arrow 30, it must pass through filter material 18 via flow arrow 32 thus the liquid will still be filtered. The porosity of filter material 18 will be correspondingly adjusted by the pressure exerted by retainment means 38 against collar 12. Even a slight pressure on collar 12 is sufficient to ensure that substantially all liquid will be filtered through filter material 18.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A liquid filter apparatus for pressure vessel comprising:

an annular flexible collar having top and bottom surfaces, outer and inner diameters, with said inner diameter forming an opening for the liquid to pass into said pressure vessel;

a bag member formed of porous flexible filter material having outer and inner surfaces and a top edge defining an opening surrounded by an integral, annular, radially extending flange portion, said filter material having effective pore size corresponding to the liquid being filtered; and means attaching said flange portion of said filter bag to said bottom surface of said collar with the circumferential edge of the filter material being closely adjacent to the outer diameter of said collar to form a gasket and filter seal when said collar is positioned in the pressure vessel; wherein said gasket and filter seal allow radial passage of fluid which normally bypasses the filter through the filter material forming said gasket and seal, whereby the majority of the fluid to be filtered passes through the filter bag from the inner to the outer surfaces.

2. The filter apparatus according to claim 1 further comprising:

at least one integral handle on said collar facilitating insertion and removal of said filter into and out of said pressure vessel.

3. The filter apparatus according to claim 1 wherein said collar is formed from polyethylene.

4. The filter apparatus according to claim 1 wherein said means for securing said filter bag to said collar comprises sewing.

5. The filter apparatus according to claim 1 wherein said means for securing said filter bag to said collar comprises welding.

6. The filter apparatus according to claim 1 wherein said means for securing said filter bag to said collar comprises glue.

* * * * *